(12) United States Patent
Fujiwara et al.

(10) Patent No.: US 12,320,740 B2
(45) Date of Patent: Jun. 3, 2025

(54) APPARATUS FOR ACQUIRING POLARIZED IMAGES

(71) Applicant: HITACHI HIGH-TECH SCIENCE CORPORATION, Tokyo (JP)

(72) Inventors: Hirohito Fujiwara, Tokyo (JP); Ryokuhei Yamazaki, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 238 days.

(21) Appl. No.: 18/094,118

(22) Filed: Jan. 6, 2023

(65) Prior Publication Data

US 2023/0296497 A1    Sep. 21, 2023

(51) Int. Cl.
*G01N 21/21* (2006.01)
*G01N 1/44* (2006.01)

(52) U.S. Cl.
CPC .............. *G01N 21/21* (2013.01); *G01N 1/44* (2013.01)

(58) Field of Classification Search
CPC ........ G01N 21/21; G01N 1/44; G01N 25/488; G01N 25/4866; G01N 25/20; G01N 25/00
See application file for complete search history.

(56) References Cited

U.S. PATENT DOCUMENTS

| | | | | |
|---|---|---|---|---|
| 2008/0002201 A1* | 1/2008 | Morita | ............... | G02B 27/286 |
| | | | | 348/E13.058 |
| 2015/0153292 A1* | 6/2015 | Nishimura | ............... | G01N 5/00 |
| | | | | 374/12 |
| 2019/0137932 A1* | 5/2019 | Ozcan | ............... | G03H 1/0465 |
| 2022/0284636 A1* | 9/2022 | Neumann | ............... | G06T 7/30 |

FOREIGN PATENT DOCUMENTS

| | | |
|---|---|---|
| JP | 1996327573 A | 12/1996 |
| JP | 2013185834 A | 9/2013 |
| JP | 2015108540 A | 6/2015 |
| KR | 101428991 B1 * | 8/2014 |

OTHER PUBLICATIONS

KR-101428991 B1—translation (Year: 2014).*

* cited by examiner

*Primary Examiner* — Tarifur R Chowdhury
*Assistant Examiner* — Carlos Perez-Guzman
(74) *Attorney, Agent, or Firm* — Holland & Hart LLP

(57) ABSTRACT

Disclosed is an apparatus for acquiring polarized images attached to a thermal analysis apparatus including a pair of sample containers housing a measurement sample and a reference sample, respectively, and a heating furnace, configured to observe at least the measurement sample through a window or an opening of the heating furnace, and including an attachment section attached to the thermal analysis apparatus, a light source, a polarizer configured to polarize light emitted from the light source, a camera and an analyzer polarize light reflected from the measurement sample or the reference sample to enter the camera after the measurement sample or the reference sample is irradiated via the window or the opening with polarized light transmitted through the polarizer. A first optical path of the polarizer and a second optical path of the analyzer are not parallel, and both the polarizer and the analyzer are rotatable.

9 Claims, 14 Drawing Sheets

APPARATUS FOR ACQUIRING POLARIZED IMAGES

CROSS-REFERENCE TO RELATED APPLICATION

This application claims priority to Japanese Patent Application No. 2022-043459, filed on Mar. 18, 2022, which is incorporated herein by reference in its entirety.

BACKGROUND

Technical Field

The present disclosure relates to an apparatus for acquiring polarized images that is attached to a thermal analysis apparatus for measuring thermal behavior of a sample to acquire a polarized image of the sample.

Description of Related Art

Conventionally, in order to evaluate temperature characteristics of a sample, a method called thermal analysis has been used, which heats the sample and measures the thermal behavior (physical change) of the measurement sample due to the change in temperature. Thermal analysis is defined in JIS K 0129:2005 "General Rules for Thermal Analysis". The thermal analysis is any technique that measures the physical properties of a measurement object (measurement sample) when the temperature of the measurement object is program-controlled. Examples of thermal analyses used commonly include five methods: (1) differential thermal analysis (DTA) to detect temperature (difference in temperature), (2) differential scanning calorimetry (DSC) to detect difference in heat flow, (3) thermogravimetry (TG) to detect mass (change in weight), (4) thermomechanical analysis (TMA) to detect mechanical properties, and (5) dynamic viscoelasticity measurement (DMA).

In recent years, there has been a demand for observation of the state of a sample during thermal analysis. A thermal analysis apparatus is known in which a window or opening is provided in a cover or a heating furnace for covering a sample so as to observe the sample via the window or opening (see Patent Documents 1 to 3, for example).

The thermal analysis apparatus in Patent Document 1 is a heat-flux-type differential scanning calorimeter (DSC), which has holders for a measurement sample and reference material installed on a heat sink through thermal resistance and measures a difference in temperature between the measurement sample and the reference material as a function of temperature. A heat flow is generated between the heat sink and each holder through thermal resistance, and the difference in heat flow is proportional to the difference in temperature described above. Then, this difference in temperature is detected by a thermocouple or the like, and is output as a DSC signal.

This differential scanning calorimeter is of a type in which a window made of transparent material is provided in part of a cover for covering an opening of a heating furnace.

The thermal analysis apparatus in Patent Documents 2 and 3 is of a type in which a pair of sample holders are contained in a furnace tube made of transparent material, and a heating furnace is moved forward to expose the furnace tube as an opening or the heating furnace itself has an opening.

PATENT DOCUMENT

Patent Document 1: Japanese Patent Application Publication No. H8-327573

Patent Document 2: Japanese Patent No. 5792660

Patent Document 3: Japanese Patent No. 6061836

Incidentally, it is sometimes desired to acquire a polarized image when observing or imaging a sample under thermal analysis via the above window or opening. A so-called polarizing microscope is known to observe such a polarized image. As an observation method using this polarizing microscope, crossed nicols is used in which light from a light source is linearly polarized by a polarizer to irradiate a sample and the light reflected therefrom is observed through an analyzer.

When the polarizing microscope is used, the polarized image of the sample is obtained by adjusting the position of rotation of the polarizer to a predetermined position and observing a sample stage while rotating the same. The analyzer is unable to rotate because it is removable.

However, when it is desired to observe the polarized image of the sample in the thermal analysis apparatus, it was extremely difficult, in principle and due to the limitations of the apparatus, to rotate the sample and thus the sample holder. Moreover, the polarized image of the sample was unable to be observed using the polarizing microscope as it is.

SUMMARY

The present disclosure has been made to solve the above problems, and an object of the present disclosure is to provide an apparatus for acquiring polarized images, which is capable of acquiring a polarized image of a measurement sample or a reference sample in a thermal analysis apparatus.

In order to achieve the above object, in accordance with an aspect of the present disclosure, there is provided an apparatus for acquiring polarized images that is attached to a thermal analysis apparatus including a pair of sample containers housing a measurement sample and a reference sample, respectively, and a heating furnace surrounding the sample containers from outside, the heating furnace having a window or an opening through which at least the measurement sample is observable. The apparatus for acquiring polarized images includes an attachment section attached to the thermal analysis apparatus, a light source, a polarizer configured to be a polarizing filter that polarizes light emitted from the light source, a camera, and an analyzer configured to be a polarizing filter that polarizes light reflected from the measurement sample or the reference sample to enter the camera after the measurement sample or the reference sample is irradiated via the window or the opening with polarized light transmitted through the polarizer. A first optical path of the polarizer and a second optical path of the analyzer are not parallel, and both the polarizer and the analyzer are rotatable.

According to the apparatus for acquiring polarized images, the first optical path of the polarizer and the second optical path of the analyzer are not parallel. Therefore, it is possible to observe and image the inside of the window or the opening with the camera by disposing the apparatus for acquiring polarized images, including the polarizer and the analyzer, outside the window or the opening of the thermal analysis apparatus. In contrast, if the first optical path and the second optical path are parallel, it is impossible to observe the inside of the window or the opening by disposing the apparatus outside the window or the opening of the thermal analysis apparatus.

Moreover, both the polarizer and the analyzer are rotatable. Therefore, even if it is difficult in principle to rotate the samples (sample holders) of the thermal analysis apparatus, it is possible to acquire the polarized image of the measurement sample or the reference sample in the thermal analysis apparatus via the window or the opening by appropriately rotating the polarizer and the analyzer.

The apparatus for acquiring polarized images may include a rotary knob having a smaller diameter than each of the polarizer and the analyzer and indirectly attached to each of the polarizer and the analyzer in order to rotate the polarizer and the analyzer.

According to the apparatus for acquiring polarized images, compared to when the knob is directly attached to the outer periphery of either the polarizer or the analyzer and rotated like a general polarizing microscope, the user can easily turn the rotary knob and perform the operation of rotation more easily and accurately since the diameter of the knob is small.

The apparatus for acquiring polarized images may include a tuning mechanism configured to tune angles of rotation of the polarizer and the analyzer.

According to the apparatus for acquiring polarized images, the angles of rotation of the polarizer and the analyzer can be tuned (linked). Therefore, the operation of rotation becomes easier and more accurate than when the angles of rotation of the polarizer and the analyzer are separately adjusted.

The apparatus for acquiring polarized images may include a tuning switching mechanism configured to switch between tuning and non-tuning of the angles of rotation of the polarizer and the analyzer.

According to the apparatus for acquiring polarized images, in addition to tuning the angles of rotation of the polarizer and the analyzer, it is possible to choose to adjust the angles of rotation independently of each other without tuning them. Therefore, the apparatus has an advantage of finely adjusting the relative angle of rotation between the polarizer and the analyzer.

In the apparatus for acquiring polarized images, the rotary knob may consist of two rotary knobs for separately adjusting the angle of rotation of the polarizer or the analyzer, respectively.

According to the apparatus for acquiring polarized images, the angles of rotation of the polarizer and the analyzer are adjustable independently of each other without being tuned. Therefore, the apparatus has an advantage of finely adjusting the relative angle of rotation between the polarizer and the analyzer.

The apparatus for acquiring polarized images may include a first motor and a second motor configured to rotate the polarizer and analyzer, respectively, and angles of rotation of the first and second motors may be controlled.

According to the apparatus for acquiring polarized images, by controlling the first and second motors, the polarizer and the analyzer can be easily and accurately rotated and the mechanism for switching between tuning and non-tuning of the angle of rotation is also facilitated.

The apparatus for acquiring polarized images may include a display section configured to display an angle of rotation of the polarizer and/or the analyzer.

According to the apparatus for acquiring polarized images, the user can easily check the angle of rotation of the polarizer and/or the analyzer by looking at the display section.

The apparatus for acquiring polarized images may include a controller configured to display, on the display section, a setting screen for setting the angle of rotation of the polarizer and/or the analyzer.

According to the present disclosure, it is possible to acquire the polarized image of the measurement sample or the reference sample in the thermal analysis apparatus.

DESCRIPTION OF SPECIFIC EMBODIMENTS

Hereinafter, embodiments of the present disclosure will be described with reference to the drawings.

Figure 3:
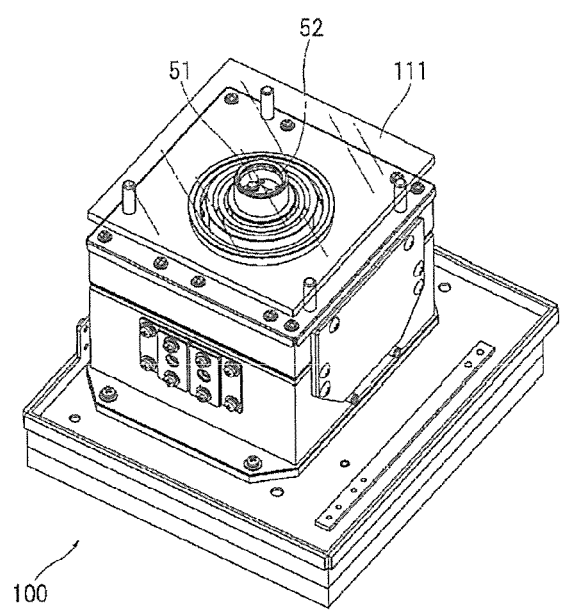
FIG. 3 is a perspective view illustrating a differential scanning calorimeter (DSC), which is a thermal analysis apparatus to which the apparatus for acquiring polarized images according to the embodiment of the present disclosure is attached.

First, a differential scanning calorimeter (DSC), which is a thermal analysis apparatus 100, will be described with reference to FIGS. 3 and 4.

The thermal analysis apparatus 100 has the same configuration as a conventional differential scanning calorimeter, except that an entire upper lid 111 of a heating furnace 101 is used as a window which is a transparent member.

Specifically, the thermal analysis apparatus 100 includes sample containers 51 and 52 disposed inside a heating furnace 101 to house a measurement sample 51 and a reference sample S2, respectively, thermal resistors 114 connected between the sample containers 51 and 52 and the heating furnace 101 to form a heat flow path therebetween, a measurement-sample-side thermocouple 107, and a reference-sample-side thermocouple 108.

A coil-shaped heater 103 is wound around the outer periphery of the heating furnace 101 to heat the heating furnace 101.

The heating furnace 101 has a cylindrical shape with an H-shaped axial cross-section. A substantially double-disk-shaped heat plate 105 is placed above an annular protrusion that protrudes radially inward from the axial center thereof.

Furthermore, the sample containers 51 and 52 are placed on the upper surface of the heat plate 105 via two heat resistors 114, respectively.

The upper lid 111 is detachably placed on the top opening of the heating furnace 101 to shield the interior of the heating furnace 101 from outside air.

Furthermore, since the entire upper lid 111 is a transparent member made of quartz glass, the upper lid 111 forms a window through which the sample containers 51 and 52 in the heating furnace 101, as well as the measurement sample S1 and the reference sample S2, may be observed.

The measurement-sample-side thermocouple 107 and the reference-sample-side thermocouple 108 penetrates the thermal resistors 114 and the thermal plate 105, and have respective tips connected to the lower surfaces of the sample containers 51 and 52 by brazing or the like. On the other hand, the other ends of the measurement-sample-side thermocouple 107 and reference-sample-side thermocouple 108 are pulled out in the downward direction of the heating furnace 101 and connected to an amplifier 124 forming a signal processing circuit.

In this way, the measurement-sample-side thermocouple 107 and reference-sample-side thermocouple 108 are able to form a so-called differential thermocouple to detect a difference in temperature between the measurement sample S1 and the reference sample S2. This difference in temperature is recorded as a heat flow difference signal. Meanwhile, the temperature of the measurement sample is recorded from the measurement-sample-side thermocouple 107.

Figure 1:
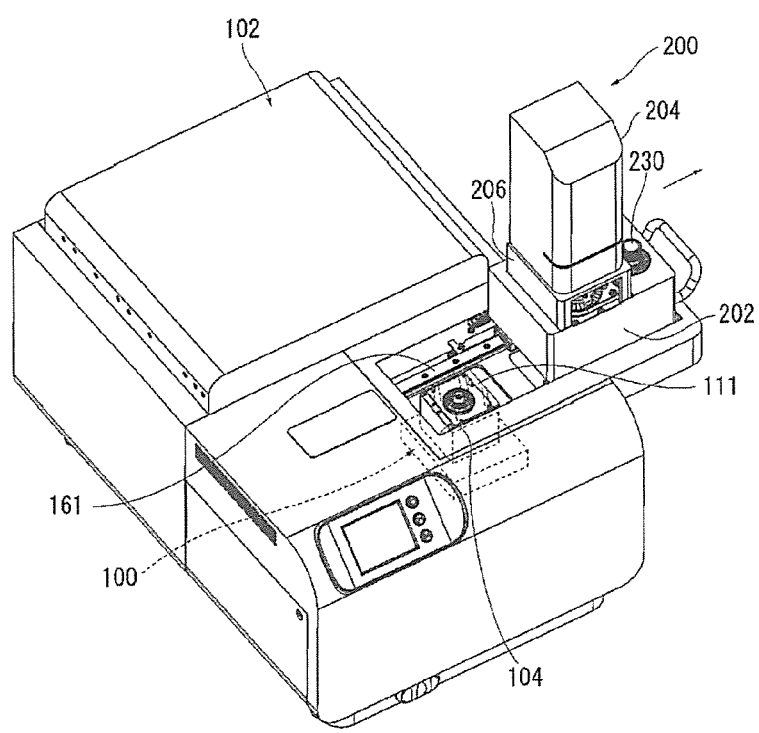
FIG. 1 is a perspective view illustrating a configuration of an example thermal analysis apparatus to which an apparatus for acquiring polarized images according to an embodiment of the present disclosure is attached.

As illustrated in FIG. 1, the entire thermal analysis apparatus 100 is installed inside a casing 102. Furthermore, the casing 102 has a rectangular opening at a position immediately above the window (upper lid) 111, and rails 161 for installing and moving an apparatus for acquiring polarized images 200 are attached to two left and right sides of the casing opening 104 in FIG. 1.

Next, the apparatus for acquiring polarized images 200 according to the embodiment of the present disclosure will be described with reference to FIGS. 2 and 4.

Figure 2:
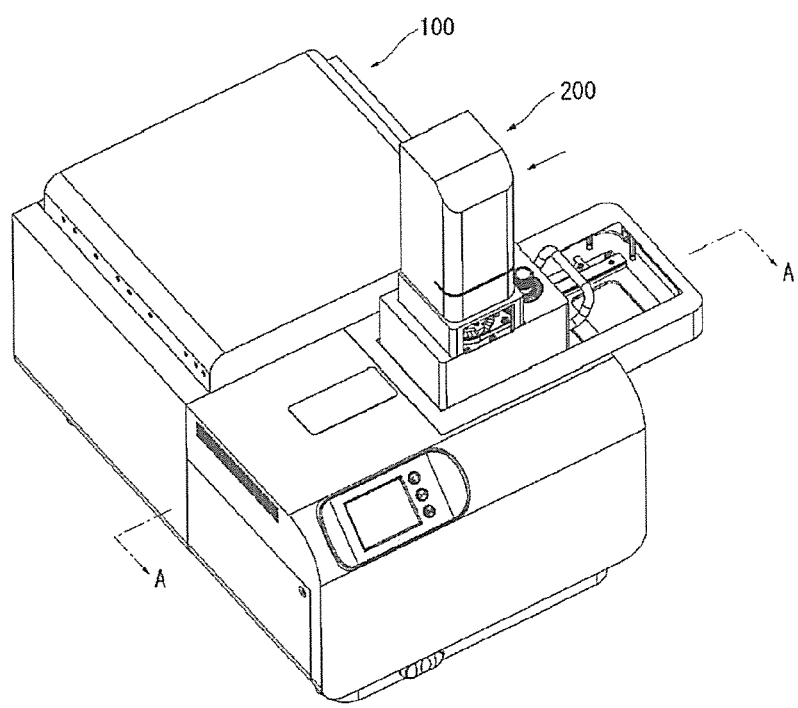
FIG. 2 is a perspective view illustrating a position of the apparatus for acquiring polarized images at the measurement position in FIG. 1.

As illustrated in FIG. 2, the apparatus for acquiring polarized images 200 includes an attachment section 202 attached to the thermal analysis apparatus 100, covers 204 and 206, and a rotary knob 230 to be described later. The attachment section 202 has a rectangular box shape as a whole. As illustrated in FIG. 4, a block 162, which constitutes a linear guide 160 together with a rail 161, is installed on the back surface of the attachment section 202. Thus, the apparatus for acquiring polarized images 200 is able to move forward and backward by moving the block 162 along the rail 161 on the thermal analysis apparatus 100.

The linear guide 160 is known, and the rolling bearings provided on the block 162 move smoothly against the rail 161. Examples of the linear guide 160 include an LM guide (registered trademark). In addition, the mechanism for moving the apparatus for acquiring polarized images 200 forward and backward is not limited to the linear guide, and may use various known actuators.

At the retracted position in FIG. 1, the apparatus for acquiring polarized images 200 is the farthest away from the thermal analysis apparatus 100, thereby exposing the casing opening 104 and the upper lid (window) 111 of the thermal analysis apparatus 100 inside the casing opening 104.

On the other hand, at the measurement position in FIG. 2, the apparatus for acquiring polarized images 200 is close to the thermal analysis apparatus 100, so that the apparatus for acquiring polarized images 200 is disposed immediately above the upper lid (window) 111.

Figure 4:
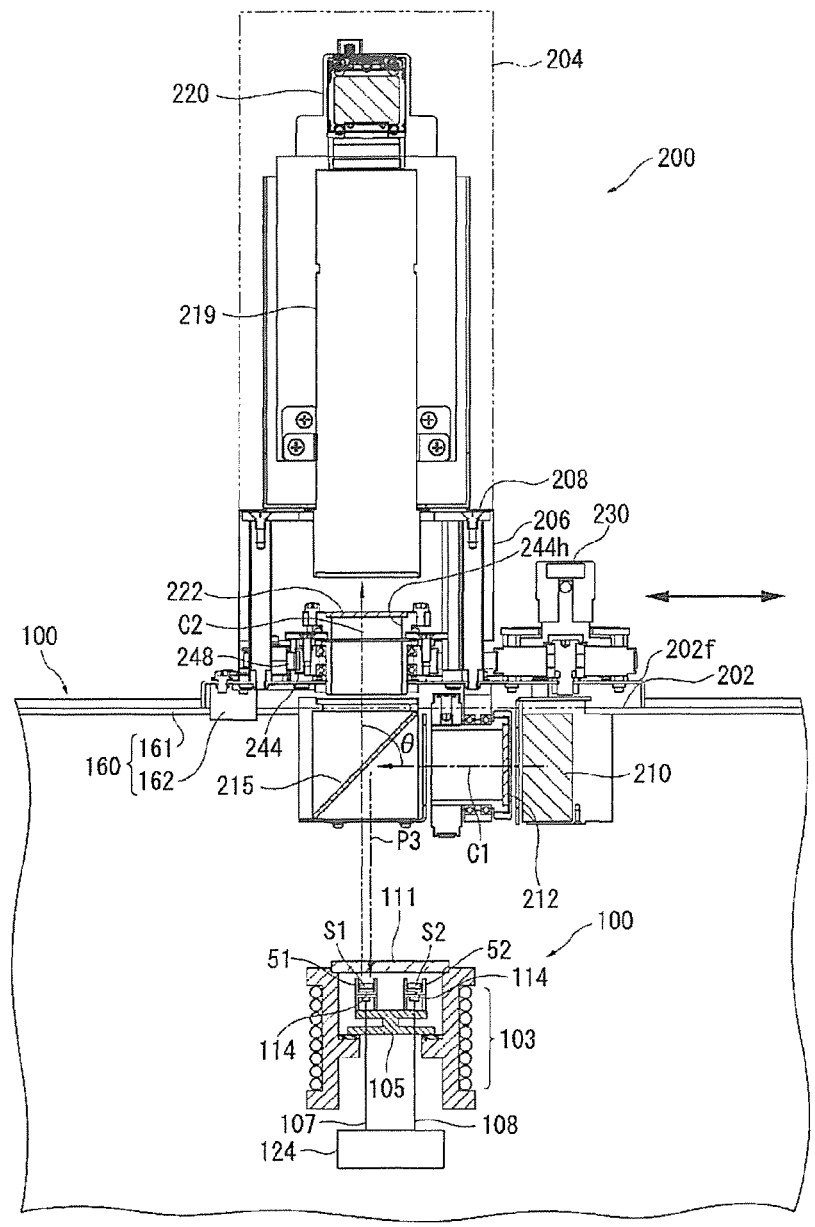
FIG. 4 is a cross-sectional view taken along line A-A of FIG. 2.

As illustrated in FIG. 4, the apparatus for acquiring polarized images 200 further includes a light source 210 such as an LED, a polarizer 212 configured to be a polarizing filter that polarizes the light emitted from the light source, a camera 220 such as a CCD camera, and an analyzer 222 configured to be a polarizing filter that polarizes light reflected from the measurement sample S1 or the reference sample S2 to enter the camera 220 after the measurement sample S1 or the reference sample S2 is irradiated via the upper lid (window) 111 with the polarized light transmitted through the polarizer 212.

The upper surface of the attachment section 202 forms a main panel 202$f$, and the light source 210 is attached to the inner surface of the main panel 202$f$ for irradiation laterally. The polarizer 212 is attached to the irradiation side of the light source 210.

Meanwhile, the analyzer 222 is attached to the outside of the main panel 202$f$ so as to cover the opening provided in the main panel 202$f$, and the camera 220 is vertically attached to the base 208 so as to cover the analyzer 222 from above. A lens group 219 is disposed between the camera 220 and the analyzer 222, and the polarized light emitted upward from the analyzer 222 is appropriately focused by the lens group 219 to be converged on the camera 220.

Here, the polarizer 212 has a first optical path (optical axis) C1 in a horizontal direction, the analyzer 222 has a second optical path (optical axis) C2 in a vertical direction, and C1 and C2 are not parallel but form a predetermined angle $\theta$ ($\theta$=90 degrees in FIG. 4).

The polarized light, which passes through the polarizer 212 and travels laterally along the first optical path (optical axis) C1, is reflected by a half mirror 215 and travels downward by 90 degrees to irradiate the measurement sample S1 or the reference sample S2. The reflected light passes through the half mirror 215 and travels upward along the second optical path (optical axis) C2 to enter the analyzer 222.

Figure 5:
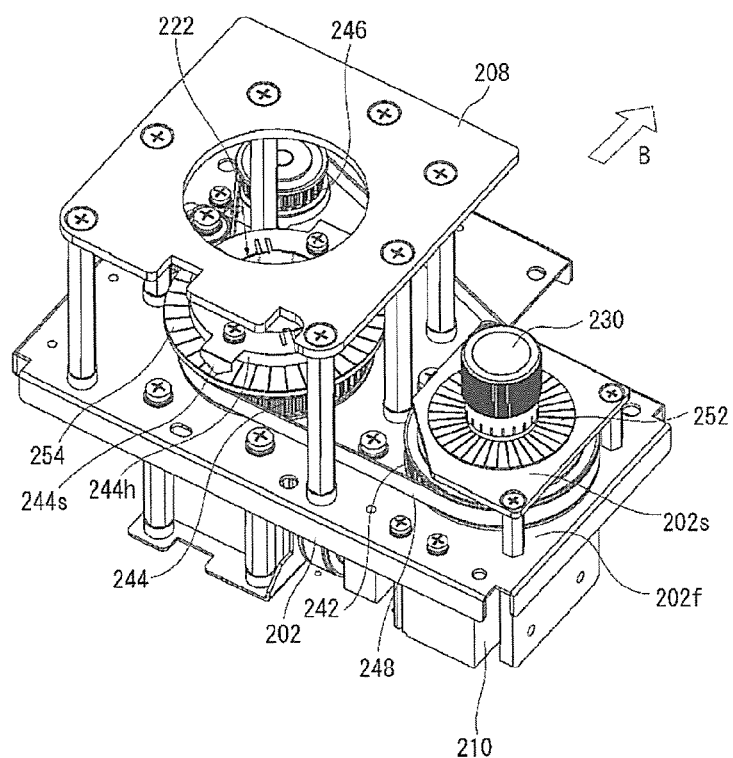
FIG. 5 is a top perspective view illustrating a rotating mechanism of a polarizer and an analyzer in the apparatus for acquiring polarized images.
Figure 6:
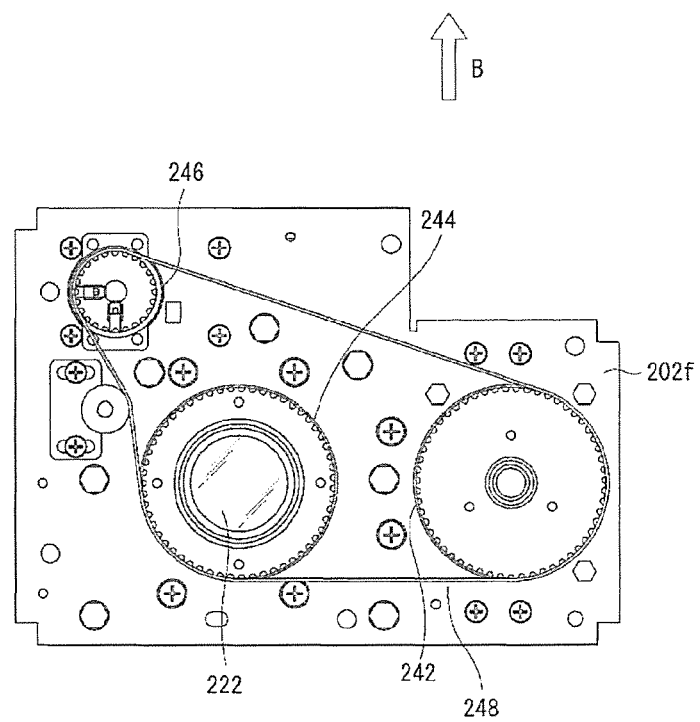
FIG. 6 is a top view illustrating the rotating mechanism of the polarizer and the analyzer in the apparatus for acquiring polarized images.
Figure 7:
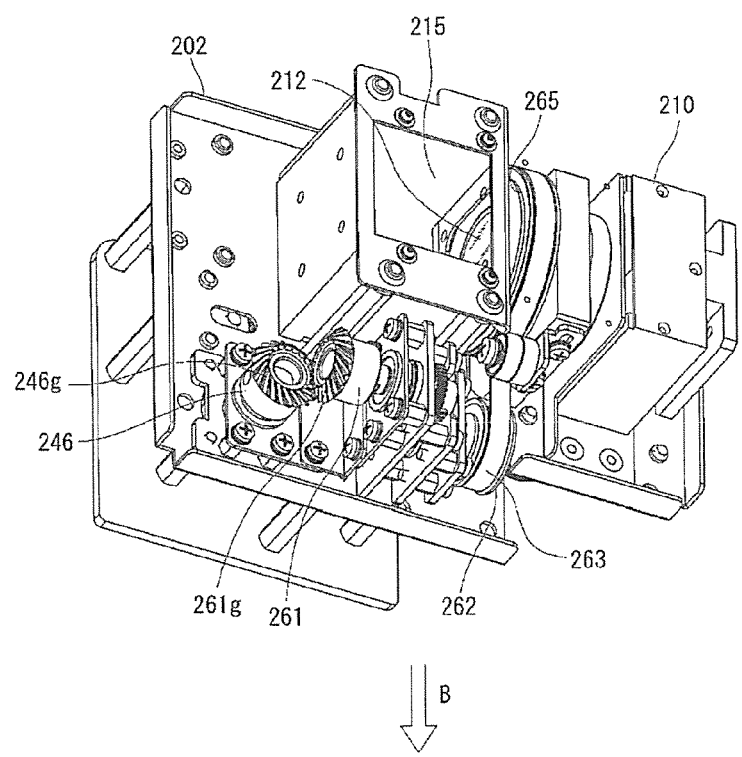
FIG. 7 is a bottom perspective view illustrating the rotating mechanism of the polarizer and the analyzer in the apparatus for acquiring polarized images.

Both the polarizer 212 and the analyzer 222 are rotatable in the apparatus for acquiring polarized images 200 according to the embodiment of the present disclosure. This will be described with reference to FIGS. 5 to 7. FIG. 5 is a top perspective view illustrating a rotating mechanism of the polarizer 212 and the analyzer 222. FIG. 6 is a top view illustrating the rotating mechanism. FIG. 7 is a bottom perspective view illustrating the rotating mechanism. The arrow B in FIGS. 5 to 7 indicates the back side of FIG. 2.

As illustrated in FIGS. 5 and 6, three pulleys 242, 244, and 246 are disposed on the upper surface of the main panel 202$f$, and a belt 248 is stretched over each of the pulleys 242, 244, and 246.

Among the pulleys 242, 244, and 246, the pulley 242 is positioned farthest from the thermal analysis apparatus 100, and a pulley cover 202$s$ is disposed above the pulley 242 with a predetermined column therebetween. A rotary knob 230 directly connected to the pulley 242 is disposed above the pulley cover 202s. When the user turns the rotary knob 230, the other pulleys 244 and 246 are also linked from the pulley 242 via the belt 248.

In addition, the rotary knob 230 has a reference position marked thereon as appropriate, and a donut-shaped angle plate 252 is attached to the outer peripheral side of the rotary knob 230 in the pulley cover 202s. The angle of rotation of the rotary knob 230 may be recognized by visually recognizing the positional relationship between the angle plate 252 and the reference position.

As illustrated in FIGS. 4 and 5, the analyzer 222 is attached to the inside of the pulley 244 via an analyzer holder 244h. When the rotary knob 230 is turned to rotate the pulley 244, the analyzer 222 is also rotated together.

Here, the analyzer holder 244h is fitted inside the pulley 244, but the analyzer holder 244h is not fixed to the pulley 244. For this reason, normally, when the rotary knob 230 is turned, the pulley 244 is linked via the belt 248.

Meanwhile, when the analyzer holder 244h is strongly rotated by hand, the analyzer holder 244h fitted to the pulley 244 rotates with respect to the pulley 244.

As a result, the angle of the analyzer holder 244h relative to the rotary knob 230 is changed. Therefore, upon having a "tuning function" by the rotary knob 230 and the pulley 244, it is possible to adjust the initial angle of rotation of the analyzer 222 and to rotate the analyzer 22 separately from the rotary knob 230 in a non-tunable manner after tuning rotation.

Here, a donut-shaped second angle plate 254 is attached to the outer peripheral side of the pulley 244, and an indicator projection 244s is attached to the analyzer holder 244h. As a result, the angle of rotation of the analyzer 222 may be recognized from the positional relationship between the indicator projection 244s and the second angle plate 254.

In addition, the angle plates 252, 254 and 351, 352 (FIG. 8) correspond to the "display section" in the claims.

On the other hand, as illustrated in FIG. 7, the pulley 246 vertically penetrates the main panel 202f and also protrudes from the lower surface of the main panel 202f The tip of the pulley 246 protruding from the lower surface of the main panel 202f is connected to a bevel gear 246g, and engages with a bevel gear 261g at a tip of a rotary shaft 261 extending horizontally on the lower surface of the main panel 202f The rotary shaft 261 is linked with another pulley 262 extending horizontally via a gear or the like, and a belt 263 is stretched over the pulleys 262 and 265.

The polarizer 212 is fixed to the inside of the pulley 265. When the rotary knob 230 is turned to rotate the pulley 242, the pulley 246, the rotary shaft 261, and the pulleys 262 and 265 are linked and rotated in this order, and the polarizer 212 is also rotated.

As described above, the first optical path (optical axis) C1 of the polarizer 212 and the second optical path (optical axis) C2 of the analyzer 222 are not parallel. Therefore, it is possible to observe and image the inside of the upper lid (window) 111 with the camera 220 by disposing the apparatus for acquiring polarized images 200, including the polarizer 212 and the analyzer 222, outside the upper lid (window) 111 of the thermal analysis apparatus 100.

In contrast, if C1 and C2 are parallel, it is impossible to observe the inside of the upper lid (window) 111 of the thermal analysis apparatus 100 by disposing the apparatus for acquiring polarized images outside the upper lid (window) 111.

Both the polarizer 212 and the analyzer 222 are rotatable. Therefore, even if it is difficult in principle to rotate the samples (sample holders 41 and 42) of the thermal analysis apparatus 100, it is possible to acquire the polarized image of the measurement sample S1 or the reference sample S2 in the thermal analysis apparatus 100 via the upper lid (window) 111 by appropriately rotating the polarizer 212 and the analyzer 222.

In the examples of FIGS. 5 to 7, the polarizer 212 and the analyzer 222 may be rotated by turning the rotary knob 230 having a smaller diameter than each of the polarizer 212 and the analyzer 222.

As a result, compared to when the knob is directly attached to the outer periphery of either the polarizer 212 or the analyzer 222 and rotated like a general polarizing microscope, the user can easily turn the knob and perform the operation of rotation more easily and accurately since the diameter of the knob is small.

In the examples of FIGS. 5 to 7, the angles of rotation of the polarizer 212 and the analyzer 222 may be tuned (linked) by turning one rotary knob 230. Therefore, the operation of rotation becomes easier and more accurate than when the angles of rotation of the polarizer 212 and the analyzer 222 are separately adjusted.

The pulleys 242 to 246, 262, and 265, the belts 248 and 263, and other members illustrated in FIGS. 5 to 7 correspond to the "tuning mechanism" in the claims.

In addition, as described above, when the analyzer holder 244h is not rotated by hand, the angles of rotation of the polarizer 212 and the analyzer 222 are tuned. However, when the analyzer holder 244h is strongly rotated by hand, the analyzer holder 244h may rotate with respect to the pulley 244 to detune or change the angle of rotation of the analyzer 222 with respect to the angle of rotation of the polarizer 212.

Furthermore, in the examples of FIGS. 10 and 11, which will be described later, it is possible to easily switch between tuning and non-tuning of the angle of rotation.

Figure 8:
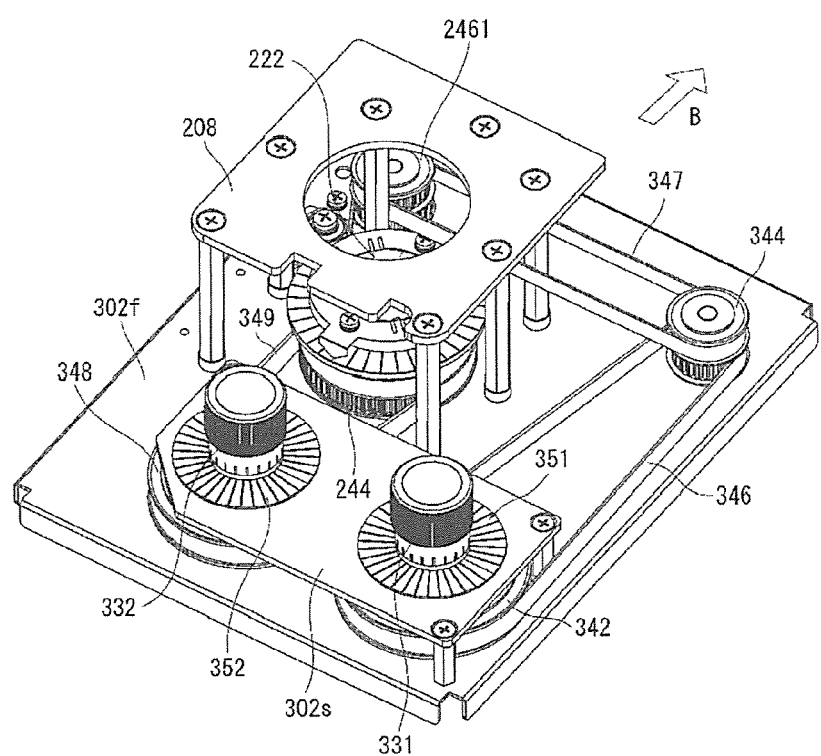
FIG. 8 is a top perspective view illustrating a configuration of an apparatus for acquiring polarized images according to a modification of the embodiment of the present disclosure.
Figure 9:
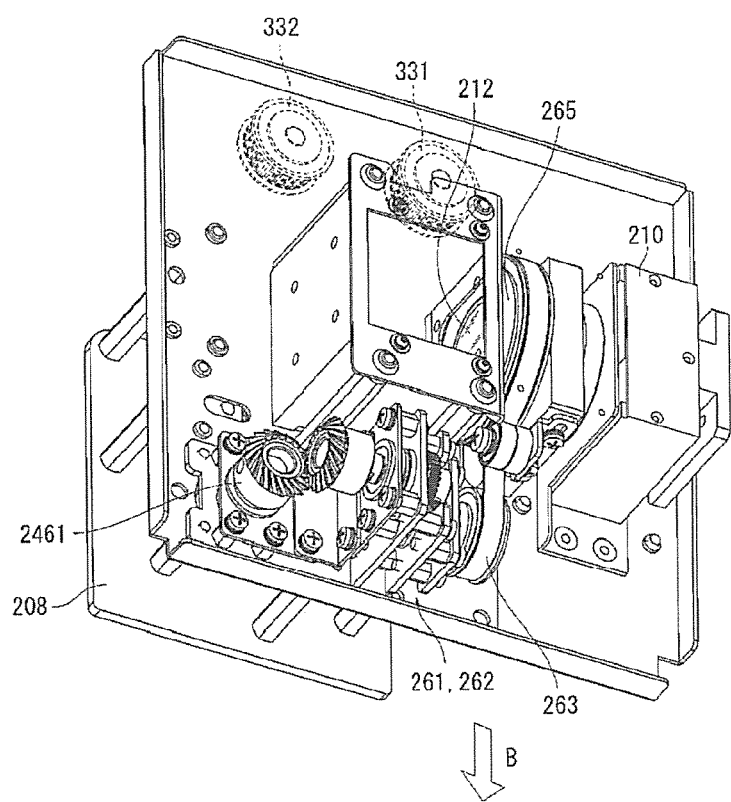
FIG. 9 is a bottom perspective view of the apparatus for acquiring polarized images of FIG. 8.

Next, an apparatus for acquiring polarized images 300 according to a modification of the embodiment of the present disclosure will be described with reference to FIGS. 8 and 9. FIGS. 8 and 9 are top and bottom perspective views of the apparatus for acquiring polarized images 300, respectively.

In addition, in the apparatus for acquiring polarized images 300, the lens group 219 above the base 208, the camera 220, and the like in the apparatus for acquiring polarized images 200 are omitted as appropriate. The same components as those of the apparatus for acquiring polarized images 200 are denoted by the same reference numerals, and a description thereof will be omitted as appropriate. Furthermore, the covers 204 and 206 are removed to clarify the internal configuration of the apparatus for acquiring polarized images 300.

The apparatus for acquiring polarized images 300 is an example in which it includes rotary knobs 331 and 332 for separately rotating the polarizer 212 and the analyzer 222, respectively, so that the angles of rotation of the polarizer 212 and the analyzer 222 are not tuned.

As illustrated in FIG. 8, in addition to the base 208, five pulleys 244, 2461, 342, 344, and 348 are disposed on an upper surface of a main panel 302f The pulley 244 is the same as that in FIG. 5. The pulley 2461 is substantially the same as the pulley 246 in FIG. 5, but may be long in the axial direction to vertically span two belts 347 and 349. Similar to the pulley 2461, the pulley 344 may be long in the axial direction to vertically span two belts 347 and 346. Among the pulleys, the pulleys 342 and 344 are positioned farthest from the thermal analysis apparatus 100. The pulley 348 is disposed in front of pulley 244. The pulley 2461 is disposed at the same position as the pulley 246 in FIG. 5.

A common pulley cover 302s is disposed above the pulleys 342 and 348 with a predetermined column therebetween. The rotary knobs 331 and 332 directly connected to the respective pulleys 342 and 348 are disposed above the pulley cover 302s.

The belt 346 is stretched between the pulleys 342 and 344. The belt 347 is stretched between the pulleys 344 and 2461, and the belts 346 and 347 form an angle of 90 degrees.

When the user turns the rotary knob 331, the other pulleys 344 and 2461 are also linked from the pulley 342 via the belts 346 and 347. When the pulley 2461 rotates, the rotary shaft 261 and the pulleys 262 and 265 may be linked to rotate the polarizer 212, similar to the pulley 246 illustrated in FIG. 7.

Meanwhile, the belt 349 is stretched between the pulleys 348 and 244.

When the user turns the rotary knob 332, the other pulley 244 is also linked from the pulley 348 via the belt 349. Rotation of the pulley 244 may allow the analyzer 222 fixed to the pulley 244 to rotate in a manner similar to that illustrated in FIG. 5.

In addition, each of the rotary knobs 331 and 332 has a reference position marked thereon as appropriate, and donut-shaped angle plates 351 and 352 are attached to the outer peripheral sides of the respective rotary knobs 331 and 332 in the pulley cover 302s. The angles of rotation of the rotary knobs 331 and 332 may be recognized by visually recognizing the positional relationship between the angle plates 351 and 352 and the reference positions, respectively.

As described above, in the apparatus for acquiring polarized images 300, the angles of rotation of the polarizer 212 and the analyzer 222 are adjustable independently of each other without being tuned. Therefore, the apparatus has an advantage of finely adjusting the relative angle of rotation between the polarizer 212 and the analyzer 222.

Next, an apparatus for acquiring polarized images 400 according to another modification of the embodiment of the present disclosure will be described with reference to FIGS. 10 and 11. FIGS. 10 and 11 are top and bottom perspective views of the apparatus for acquiring polarized images 400, respectively.

In addition, in the apparatus for acquiring polarized images 400, the lens group 219 above the base 208, the camera 220, and the like in the apparatus for acquiring polarized images 200 are omitted as appropriate. The same components as those of the apparatus for acquiring polarized images 200 are denoted by the same reference numerals, and a description thereof will be omitted as appropriate. Furthermore, the covers 204 and 206 are removed to clarify the internal configuration of the apparatus for acquiring polarized images 400.

The apparatus for acquiring polarized images 400 is an example in which it includes a tuning switching mechanism configured to rotate the polarizer 212 and the analyzer 222 in a tunable or non-tunable manner (independently of each other).

This is also an example in which the angle of rotation is adjusted on liquid crystal touch panels 431 and 432 instead of the rotary knob.

Figure 10:
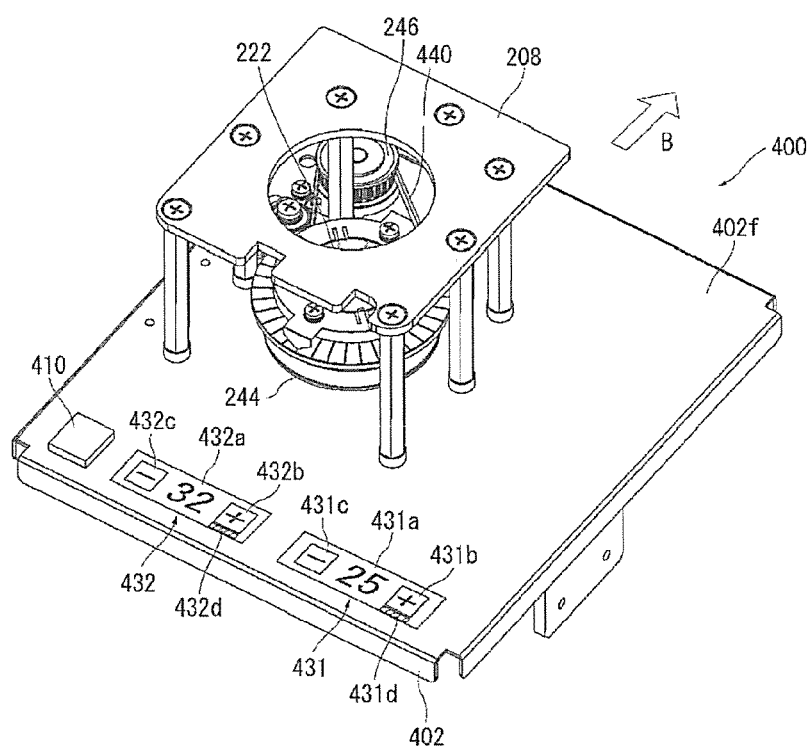
FIG. 10 is a top perspective view illustrating a configuration of an apparatus for acquiring polarized images according to another modification of the embodiment of the present disclosure.

As illustrated in FIG. 10, in addition to the base 208, two pulleys 244 and 246 are disposed on an upper surface of a main panel 402f. The pulleys 244 and 246 are the same as those in FIG. 5.

Two liquid crystal touch panels 431 and 432 and a tuning switching button 410 are disposed on the front surface of the main panel 402f.

A belt 440 is stretched between the pulleys 244 and 246.

Figure 11:
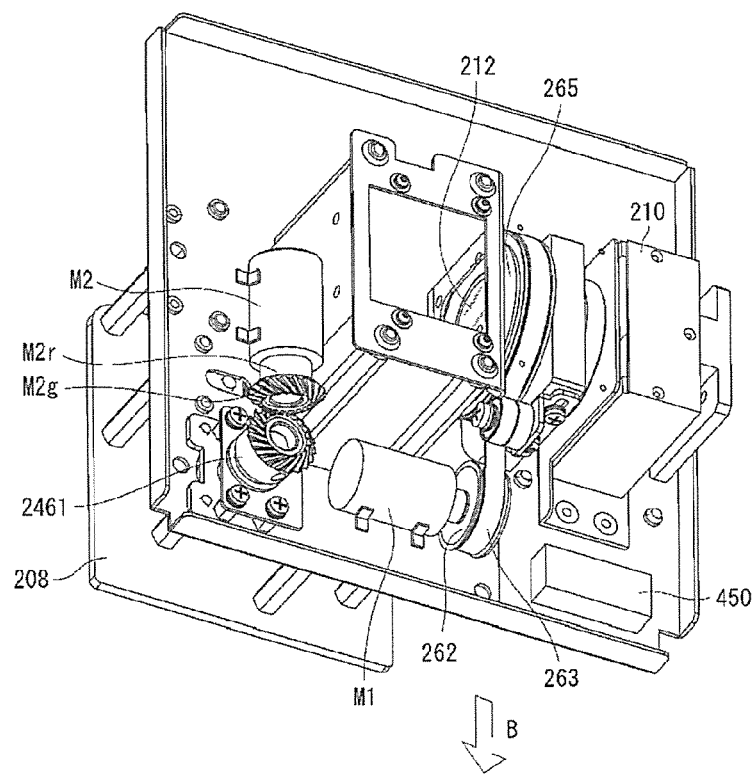
FIG. 11 is a bottom perspective view of the apparatus for acquiring polarized images of FIG. 10.

As illustrated in FIG. 11, similar to FIG. 7, the pulley 246 vertically penetrates the main panel 402f and also protrudes from the lower surface of the main panel 402f. The pulley 246 has a tip connected to a bevel gear 246g. Meanwhile, a servomotor M2 is attached to the lower surface of the main panel 402f, and has a rotary shaft M2r extending horizontally. A bevel gear M2g is connected to the tip of the rotary shaft M2r to engage with the bevel gear 246g.

Thus, when the servomotor M2 rotates, the pulleys 246 and 244 are linked and rotated in this order via the bevel gears M2g and 246g, and the analyzer 222 fixed to the pulley 244 is also rotated.

On the other hand, another servomotor M1 is also attached to the lower surface of the main panel 402f, and has a rotary shaft attached to the pulley 262. A belt 263 is stretched between the pulleys 262 and 265.

Thus, when the servomotor M1 rotates, the pulleys 262 and 265 are linked and rotated in this order, and the polarizer 212 fixed to the pulley 265 is also rotated.

Here, a controller (microcomputer) 450 is attached to the lower surface of the main panel 402f. When the user sets the angles of rotation of the polarizer 212 and the analyzer 222 on the liquid crystal touch panels 431 and 432, the controller 450 controls the angles of rotation of the servomotors M1 and M2 based on the setting data thereof.

In addition, the current angle of rotation of the polarizer 212 is displayed on the central screen 431a of the liquid crystal touch panel 431. Touching the + box 431b on the right side of the liquid crystal touch panel 431 increases a set value of the angle of rotation, and touching the − box 431c on the left side of the liquid crystal touch panel 431 decreases a set value of the angle of rotation.

When the setting of the angle of rotation is completed and the determination button 431d is touched, the servomotor M1 operates until the set angle of rotation is reached.

The angle of rotation of the servomotor M2 may also be set in the same way by the central screen 432a, + box 432b, − box 432c, and determination button 432d of the liquid crystal touch panel 432.

When the tuning switching button 410 is depressed, the angles of rotation of the polarizer 212 and the analyzer 222 may be rotated in anon-tunable manner (independently of each other) by the liquid crystal touch panels 431 and 432 as described above.

Meanwhile, when the tuning switching button 410 is depressed again, it is switched to a tuning mode. Accordingly, when the angle of rotation of either the polarizer 212 or the analyzer 222 is set with any one of the liquid crystal touch panels 431 and 432, the angle of rotation of the other polarizer 212 or analyzer 222 is automatically set according to the predetermined tuning angle.

As described above, in the apparatus for acquiring polarized images 400, the angles of rotation of the polarizer 212 and the analyzer 222 can be switched between tuning and non-tuning.

Moreover, the angles of rotation of the polarizer 212 and the analyzer 222 can be set by the liquid crystal touch panels 431 and 432, thereby making setting work easier.

In addition, the servomotors M1 and M2 correspond to the "first and second motors" respectively, and the liquid crystal touch panels 431 and 432 correspond to the "display section" in the claims.

Moreover, the tuning switching button 410 and the controller 450 correspond to the "tuning mechanism" in the claims.

It goes without saying that the present disclosure is not limited to the embodiments described above, but extends to various modifications and equivalents within the spirit and scope of the present disclosure.

The types and number of polarizers and analyzers are not limited to those described above, nor are the rotating mechanisms of the polarizers and analyzers. The shape and structure of the rotary knob are also not limited.

The thermal analysis apparatus may be based on the principle of measuring thermal behavior due to the change in temperature by heating or cooling of the measurement object. In addition to the above-mentioned thermogravimetric (TG) apparatus, the thermal analysis apparatus is applicable to all thermal analyses that are defined in HS K 0129:2005 "General Rules for Thermal Analysis" and measure the physical properties of the measurement objet (sample) when the temperature of the measurement object is program-controlled. Specifically, examples thereof include (1) differential thermal analysis (DTA) to detect temperature (difference in temperature), (2) differential scanning calorimetry (DSC) to detect difference in heat flow, and (3) thermogravimetry (TG) to detect mass (change in weight).

Figure 12:
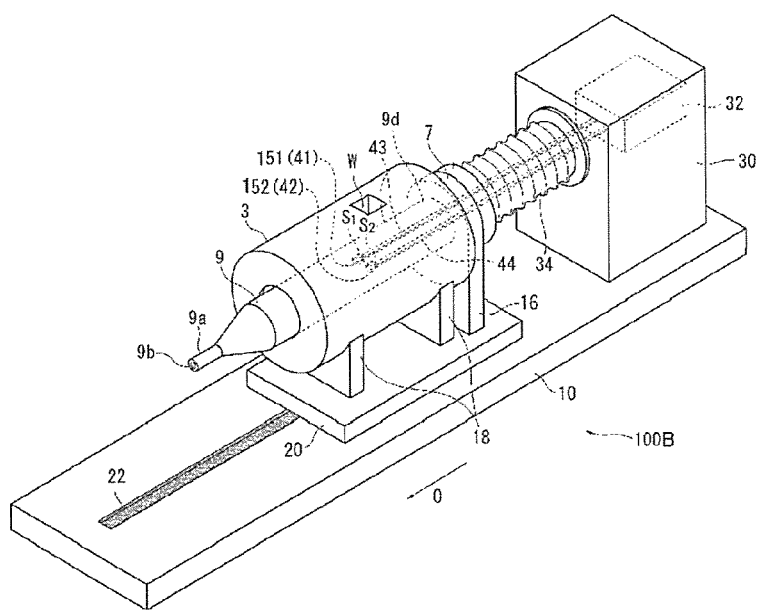
FIG. 12 is a cross-sectional view illustrating a configuration of a thermogravimetric (TG) apparatus, which is a thermal analysis apparatus to which the apparatus for acquiring polarized images according to the embodiment of the present disclosure is attached.
Figure 13:
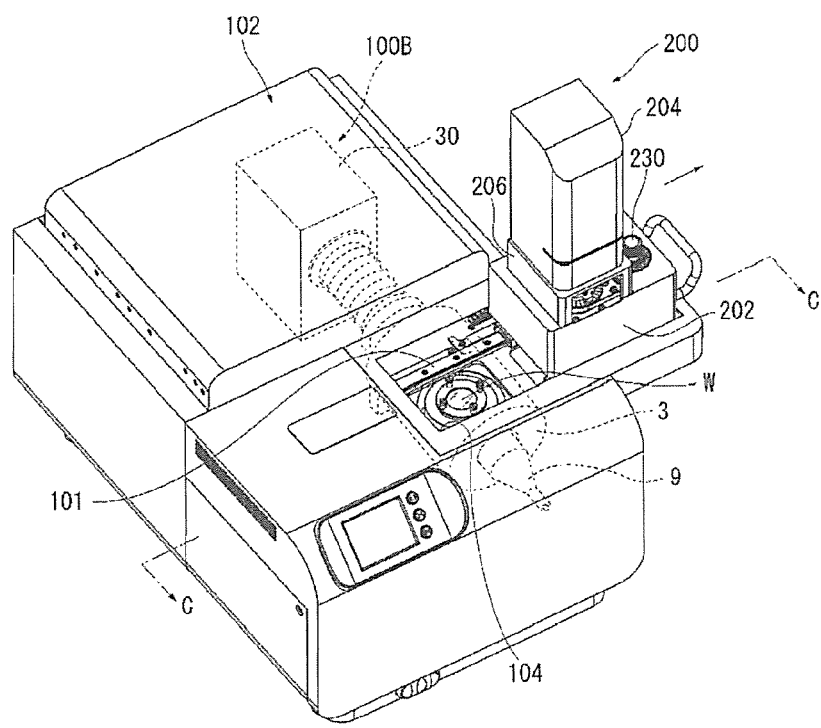
FIG. 13 is a perspective view illustrating a configuration of an apparatus for acquiring polarized images attached to the thermogravimetric (TG) apparatus.
Figure 14:
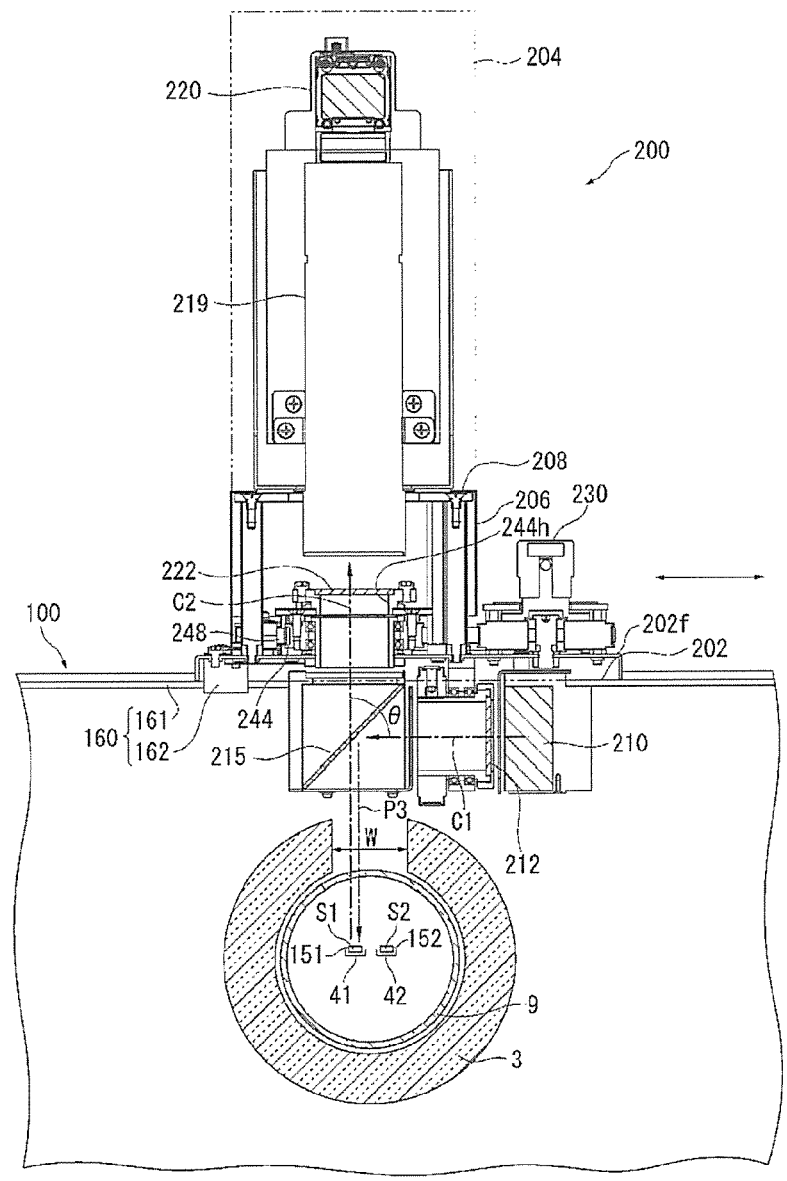
FIG. 14 is a cross-sectional view taken along line C-C of FIG. 13.

For example, as illustrated in FIGS. 12 to 14, the thermal analysis apparatus 100B may be a thermogravimetric (TG) apparatus.

In addition, along the axial direction O, the tip part 9a side of the furnace tube 9 is referred to as a "front end (side)", and the opposite side is referred to as a "rear end (side)". The thermal analysis apparatus 100B in FIG. 12 corresponds to the thermal analysis apparatus in Patent Documents 2 and 3 described above.

The thermal analysis apparatus 100 constitutes a thermogravimetric (TG) apparatus, and includes a cylindrical furnace tube 9 made of transparent material, a cylindrical heating furnace 3 surrounding the furnace tube 9 from the outside, a pair of sample holders 41 and 42 disposed inside the furnace tube 9, a support base 20, a measurement chamber 30 connected to the rear end 9d of the furnace tube 9 in the axial direction O thereof, a weight detector 32 disposed in the measurement chamber 30 to measure changes in weight of samples 51 and S2, and a base 10 having an upper surface on which the measurement chamber 30 is placed. Here, the measurement sample (sample) S1 and the reference sample S2 are housed in a pair of sample containers 151 and 152, respectively, and the sample containers 151 and 152 are placed on the pair of sample holders 41 and 42, respectively. The reference sample S2 is a reference material (reference) for the measurement sample.

The lower portion of the heating furnace 3 is supported by two columns 18, and each column 18 is connected to the upper surface of the support base 20. A flange part 7 is fixed to the outside of the rear end 9d of the furnace tube 9. The lower portion of the flange part 7 is supported by a column 16, and the column 16 is connected to the upper surface of the support base 20.

Furthermore, a linear actuator 22 is disposed in a groove formed in the axial direction O of the base 10. The linear actuator 22 enables the support base 20 to move forward and backward along the groove in the axial direction O.

The heating furnace 3 includes a cylindrical core tube 3c forming the inner surface of the heating furnace 3, a heater 3b fitted around the core tube 3c, and a cylindrical outer cylinder 3a having side walls at both ends thereof. The heating furnace 3 heats the furnace tube 9 (and the samples S1 and S2 therein) in a non-contact manner.

Furthermore, the upper surface of the heating furnace 3 is formed with a substantially rectangular opening W that penetrates from the outer cylinder 3a toward the core tube 3c.

Here, the sample container 151 for holding the measurement sample S1 is an open bottomed cylindrical container with an open upper surface so as to observe the measurement sample S1. On the other hand, the sample container 152 for holding the reference sample S2 may be a closed container, instead of an open bottomed container, because it does not need to be observable. However, it is preferable that the sample container 152 have the same shape as the sample container 151 in order to ensure that the samples S1 and S2 are heated under the same conditions within the furnace tube 9.

The opening W allows the samples S1 and S2 housed in the transparent furnace tube 9 to be observed from the outside.

The furnace tube 9 is tapered toward the tip part 9a, and the tip part 9a is in the form of an elongated capillary to have an exhaust port 9b that is open at the tip thereof. Purge gas is appropriately introduced into the furnace tube 9 from the rear end thereof. This purge gas, decomposition products of the sample due to heating, and the like are exhausted to the outside through the exhaust port 9b.

The transparent material that makes up the furnace tube 9 is a material that transmits visible light with a predetermined light transmittance, including a translucent material. Quartz glass, sapphire glass, or yttrium-aluminum-garnet (YAG) ceramics may be suitably used as the transparent material.

The sample holders 41 and 42 are connected with respective balance arms 43 and 44 extending rearward in the axial direction O. Moreover, thermocouples may be installed immediately under the sample holders 41 and 42 to measure a sample temperature.

The measurement chamber 30 is disposed at the rear end of the furnace tube 9. The measurement chamber 30 and the furnace tube 9 are in internal communication with each other through a tubular bellows 34.

The known weight detector 32 having a coil, a magnet and a position detection part is disposed in the measuring chamber 30. The weight of each of the samples S1 and S2 at the tips of the balance arms 43 and 44 is measured by measuring the electric current flowing such that the balance arms 43 and 44 are horizontal.

In addition, when the samples S1 and S2 are set (disposed) or exchanged, the support base 20 is moved forward toward the tip of the furnace tube 9 and the sample holders 41 and 42 are exposed rearward from the furnace tube 9 and the heating furnace 3.

As illustrated in FIG. 14, in the same manner as in FIG. 4, the polarized light, which passes through the polarizer 212 and travels laterally along the first optical path (optical axis) C1, is reflected by the half mirror 215 and travels downward by 90 degrees to irradiate the measurement sample S1 or the reference sample S2, and the reflected light passes through the half mirror 215 and travels upward along the second optical path (optical axis) C2 to enter the analyzer 222.

What is claimed is:

1. An apparatus for acquiring polarized images that is attached to a thermal analysis apparatus comprising a pair of sample containers housing a measurement sample and a reference sample, respectively, and a heating furnace surrounding the sample containers from outside, the heating furnace having a window or an opening through which at least the measurement sample is observable, the apparatus for acquiring the polarized images comprising:
- an attachment section attached to the thermal analysis apparatus;
- a light source;
- a polarizer configured to be a polarizing filter that polarizes light emitted from the light source;
- a camera; and
- an analyzer configured to be a polarizing filter that polarizes light reflected from the measurement sample or the reference sample to enter the camera after the measurement sample or the reference sample is irradiated via the window or the opening with polarized light transmitted through the polarizer,
- wherein a first optical path of the polarizer and a second optical path of the analyzer are not parallel and
- wherein both the polarizer and the analyzer are configured to be rotatable such that the polarized images of the measurement sample and the reference sample in the thermal analysis apparatus via the window or the opening are selectively acquired without rotating the pair of sample containers.

2. The apparatus according to claim 1, further comprising a rotary knob having a smaller diameter than each of the polarizer and the analyzer and indirectly attached to each of the polarizer and the analyzer so as to rotate the polarizer and the analyzer.

3. The apparatus according to claim 1 or 2, further comprising a tuning mechanism configured to tune angles of rotation of the polarizer and the analyzer.

4. The apparatus according to claim 3, further comprising a tuning switching mechanism configured to switch between tuning and non-tuning of the angles of rotation of the polarizer and the analyzer.

5. The apparatus according to claim 1, further comprising two rotary knobs, the two rotary knobs having smaller diameters than the polarizer and the analyzer, respectively, and indirectly attached to the polarizer and the analyzer, respectively, so as to rotate the polarizer and the analyzer, respectively, wherein the two rotary knobs are for separately adjusting an angle of rotation of the polarizer or the analyzer, respectively.

6. The apparatus according to claim 3, further comprising a first motor and a second motor configured to rotate the polarizer and the analyzer, respectively, wherein angles of rotation of the first motor and the second motor are controlled.

7. The apparatus according to claim 4, further comprising a first motor and a second motor configured to rotate the polarizer and analyzer, respectively, wherein angles of rotation of the first and second motors are controlled.

8. The apparatus according to claim 1, further comprising a display section configured to display an angle of rotation of the polarizer and/or the analyzer.

9. The apparatus according to claim 8, further comprising a controller configured to display, on the display section, a setting screen for setting the angle of rotation of the polarizer and/or the analyzer.

* * * * *